US011772908B1

(12) United States Patent
Keck et al.

(10) Patent No.: US 11,772,908 B1
(45) Date of Patent: Oct. 3, 2023

(54) AUTOMATED ITEM PICKING STATIONS

(71) Applicant: Amazon Technologies, Inc., Seattle, WA (US)

(72) Inventors: Kevin W. Keck, Seattle, WA (US); Roland J. Menassa, Macomb, MI (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 17/375,653

(22) Filed: Jul. 14, 2021

Related U.S. Application Data

(60) Provisional application No. 63/195,887, filed on Jun. 2, 2021.

(51) Int. Cl.
*B65G 47/50* (2006.01)
*B65G 43/08* (2006.01)
*B65G 47/90* (2006.01)

(52) U.S. Cl.
CPC ............. *B65G 47/50* (2013.01); *B65G 43/08* (2013.01); *B65G 47/905* (2013.01)

(58) Field of Classification Search
CPC ..................................................... B65G 47/50
See application file for complete search history.

(56) References Cited

U.S. PATENT DOCUMENTS

| 9,555,978 B1* | 1/2017 | Hanssen | B65G 1/1378 |
| 9,962,743 B2* | 5/2018 | Bombaugh | B65G 47/44 |
| 10,322,438 B2* | 6/2019 | Engel | B65G 1/1373 |

FOREIGN PATENT DOCUMENTS

WO   WO-2016005116 A1 *   1/2016   ............. B07C 5/126

* cited by examiner

*Primary Examiner* — William R Harp
(74) *Attorney, Agent, or Firm* — Eversheds Sutherland (US) LLP

(57) ABSTRACT

Systems and methods are disclosed for automatic item picking stations. In one embodiment, an example automated item picking station may include a first set of container slots configured to support a first set of containers, and a second set of container slots configured to support a second set of containers. The item picking station may include a first item handling device configured to transport a first item to a container in the first set of containers or the second set of containers, a first empty container shuttle disposed adjacent to the first set of container slots, and an optional second empty container shuttle disposed adjacent to the second set of container slots. The item picking station may include a takeaway conveyor disposed between the first set of container slots and the second set of container slots, the takeaway conveyor configured to transport full containers to a downstream processing station.

19 Claims, 10 Drawing Sheets

AUTOMATED ITEM PICKING STATIONS

CROSS-REFERENCE TO RELATED APPLICATION(S)

This application claims the benefit of U.S. Application No. 63/195,887, filed Jun. 2, 2021, which is hereby incorporated by reference in its entirety.

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved. Further, during fulfillment of online orders, items that are part of an order may be picked from inventory at a fulfillment center. In some instances, such processes may be cumbersome and time consuming Automated item picking stations may therefore be desired.

Figure 1:
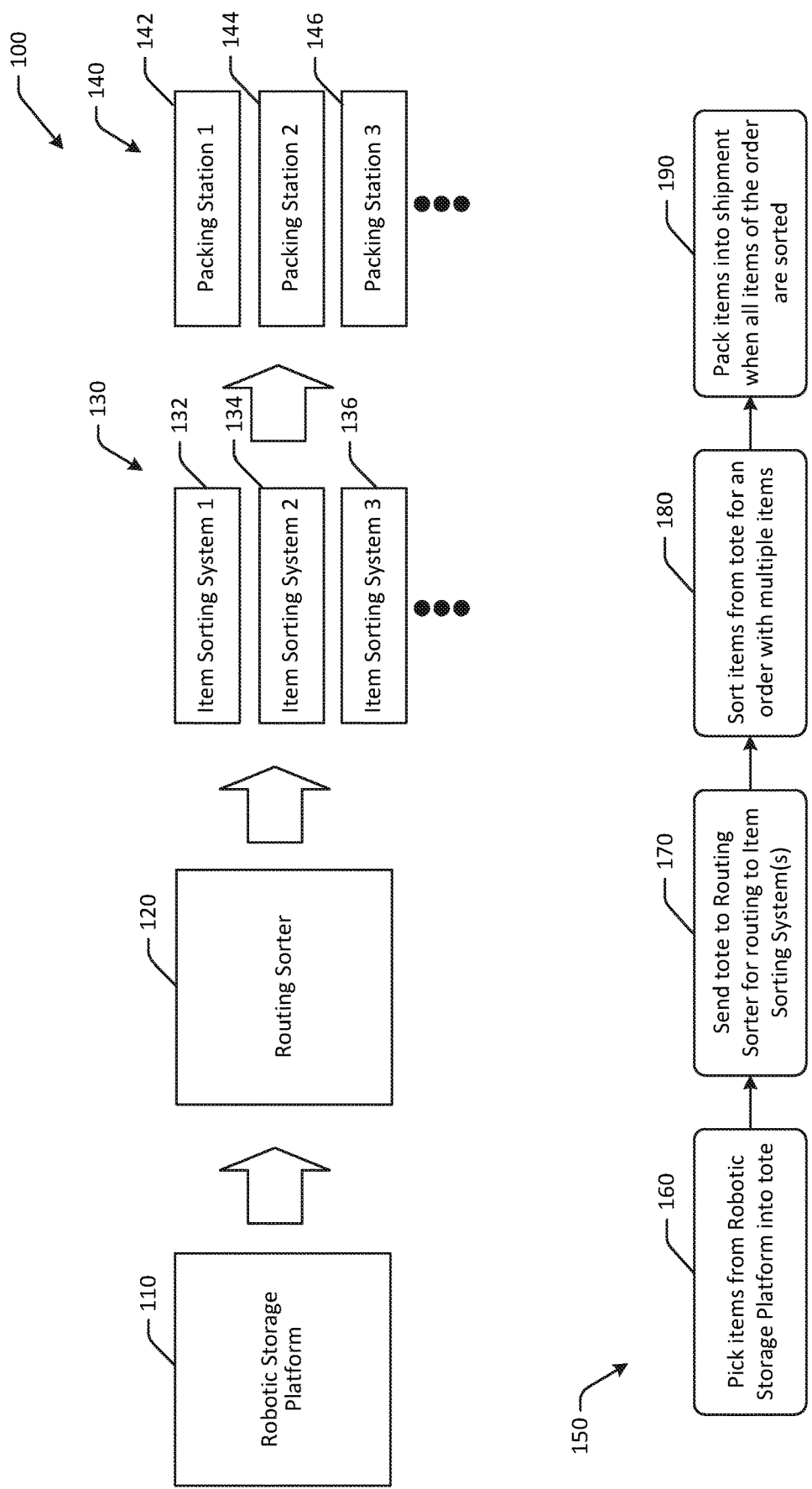
FIG. 1 is a hybrid schematic illustration of an example use case for automated item picking stations and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, once items are packed into packages for shipping, such packages may be processed for delivery to a user, where such processes may include sortation of labeled packages, and so forth. Depending on the type of item and/or the number of items inside a package, packages may have different sizes and weights. As such packages are sorted or otherwise moved throughout facilities, the packages may be handled by robots or machines in some instances, such as conveyors, diverters, and so forth. At times, packages may be directed down chutes or ramps into containers for aggregation. For example, packages destined for a similar destination may be aggregated into a container for shipment.

Some fulfillment centers include pick stations (e.g., stations at which items are picked from inventory, etc.) that are manual or semi-automatic. The semi-automatic pick stations, empty totes may be dispensed at one specific location overhead, and full totes may be released automatically. An operator may remove the empty tote and replace the full tote. In manual stations, the operator may release the full tote, and replenish with an empty tote from a stack of totes stocked by a water spider. In both cases, the software and/or control system can direct an operator to pick an item from a specific location on an item pod. The operator may then scan the item, drop it in a tote as directed by a drop-to-light, and finally press the lit button for confirmation. This process repeats until the operator releases a full tote based on fill volume.

During a picking process for items, such as items to fulfill orders, an operator may retrieve an item from a container. For example, a pod on which multiple containers are disposed may be brought to the operator using an autonomous robot, and the operator may pick an item from one or more of the containers. The pod may then be moved to another location. The operator may scan the item to confirm the correct item has been picked, and may place the item into another container for aggregation of the online order. Once the container is full and/or has all of the items in an order, the operator may push the container onto a conveyor for downstream processing (e.g., packing, shipment, etc.). However, the number of steps involved in such a picking process may not only cause the process to be time-consuming, but may also involve a relatively high level of manual effort.

Embodiments of the disclosure include automated item picking stations that automate and/or remove several steps of manual or semi-automatic picking processes, so as to not only increase throughput by reducing overall picking times, but also reduce the level of manual effort needed on behalf of operators to pick items. Certain embodiments include material handling equipment that is configured to transport items at high speeds, thereby allowing more than a number of containers within arm's reach to be picked into (e.g., an operator may pick to, for example, six containers simultaneously in a manual picking process, etc.). In one embodiment, an operator can pick to twenty or more containers simultaneously, thereby increasing overall efficiency. Picking to a certain number of containers indicates that the operator can aggregate items for twenty orders at the same time, instead of six in one example. Embodiments of the disclosure include automated item picking stations that can increase throughput and decrease processing times during various order fulfillment processes.

Some embodiments of picking stations reduce a cognitive load required to pick and stow, resulting in an increase in item throughput of, in one example, about 10 percent.

The pick process can achieve further improvements by restricting the operator to drop a picked item to one location while automating the dispensing into a tote process step, automating the release of a full tote, replenishing with an empty tote and eliminating the pick to light button press. With automation, the number of tote locations can increase from, in one example, six locations to ten locations without affecting the pick cycle time. Increasing the pick locations can allow the system to pick to totes based on packaging process path to include flexible padded and unpadded paper, flexible padded and unpadded plastic, single and multi-item corrugates, etc.

In existing manual pick processes, a manual pick and drop of an item can take between 2.4 and 2.7 secs, depending on travel distance. However, average times can be about 13 seconds per item, resulting in about 240-280 picks per hour. For example, the steps that an operator takes to pick an item may include picking, scanning, and placing an empty tote (2.5 seconds), searching for an item in a pod (4 seconds), waiting for pods (2.5 seconds), handling step ladders, rearranging items in containers for better space utilization, etc. There are also additional possible time losses in the process that increase the cycle time by 10 secs. These losses include tasks like replenishing empty totes, managing loaded totes for better cube utilization, and sometimes dealing with wrong picked items. The combinatorial nature of these steps below are the primary reason for extending the cycle time from the theoretical 2.55 secs (avg. 2.4-2.7) to the 13 secs today.

Embodiments of the disclosure include automated item picking stations that reduce the operator cognitive load. Some embodiments have achieved a seven percent productivity improvement. In order to reduce the observed cycle time, embodiments apply additional automation to the process that restricts the operator movement to basic pick, scan, and drop action while automating the rest of the tote handling process including the drop to light acknowledgement. Embodiments may use tote-shaking mechanisms to alleviate any potential reduced tote capacity problem.

Some embodiments may include a pick process where the need to press the button for drop-to-light confirmation is eliminated, thereby reducing the overall cycle time of pick-scan-drop to 2.0 seconds. Additional savings result from eliminating the manual handling of empty totes during the replenishment cycle, which can happen every 100 secs or so on average and takes about 2.5 seconds per event, and the elimination of rearranging items in totes, which happens at a frequency of once every 2.5 minutes and takes about six seconds per event. Additional savings are possible by reducing the workload in dealing with non-scannable items, and handling the stepladder when required. For non-scannable items, the operator can simply release the item for the system to handle automatically by routing items to a kick out tote. Non-scannable items frequency occurs once every 15 minutes and can last up to 24 seconds per event. Embodiments may include a station design that has an automated stepladder handling using an automatic retractable step assist similar to large cars today. Steps extend and retract within the drive shuttle time allowing an operator to step higher for the top two rows. In some embodiments, stepladders are used at a frequency of once every five minutes, and require about 3 seconds per event.

From a process perspective, both operators can dispense items to same system and hence providing 20 totes total each representing a unique opportunity for downstream routing and processing and fulfilling same order by two operators and hence speeding up the fulfillment process.

Some embodiments automate the pick stations within sortation centers or other fulfillment centers. For manual pick processes, manual replenishment of empty totes may be required. An operator can pick to six totes. In contrast, embodiments automate the handling of totes, reduce walk time, and open up two neighboring stations to 20 totes for faster fulfillment.

In addition, the need to press the button for drop-to-light confirmation is eliminated, reducing the overall cycle time of pick-scan-drop to 2.0 seconds. Additional savings result from eliminating the manual handling of empty totes during the replenishment cycle and the elimination of rearranging items in totes.

In addition to these improvements, embodiments provide a minimal hand-body motion from pick to drop off to minimize body twists. In this case, the operator will drop the item on a conveyor/shutter that is perpendicular to the dispensing mechanism servicing 20 totes. Some embodiments accommodate a buffer or two (or more) for the drop-off area to decouple the operator from the traversing shuttle ladle system, as depicted in FIGS. 3A-5.

Figure 3A:
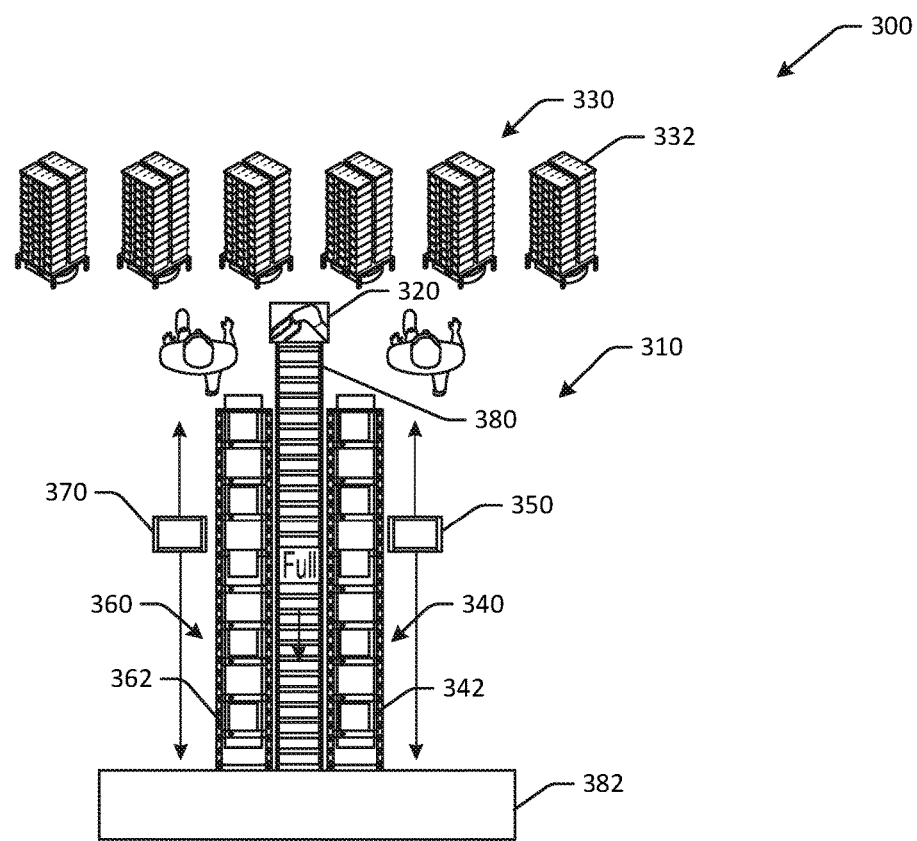
FIGS. 3A-3B are schematic illustrations of an example automated item picking station in various views in accordance with one or more embodiments of the disclosure.
Figure 3A:
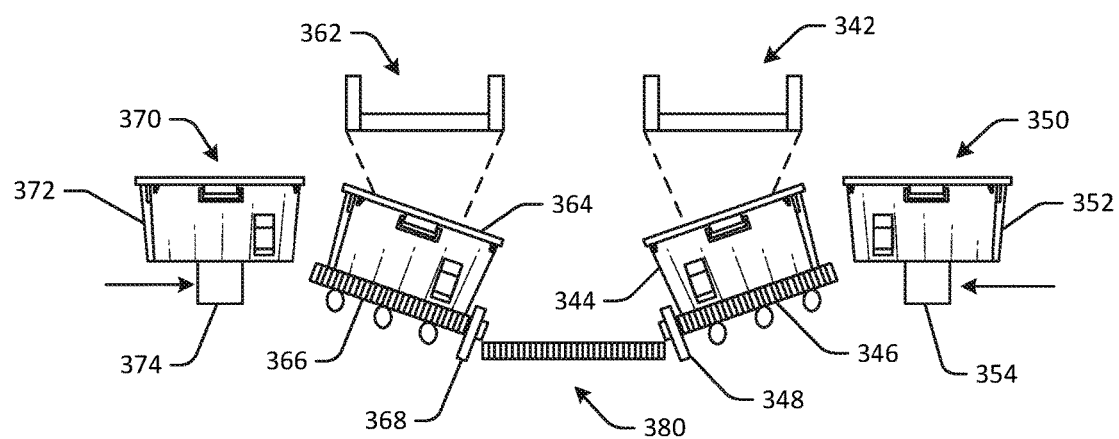
Figure 4A:
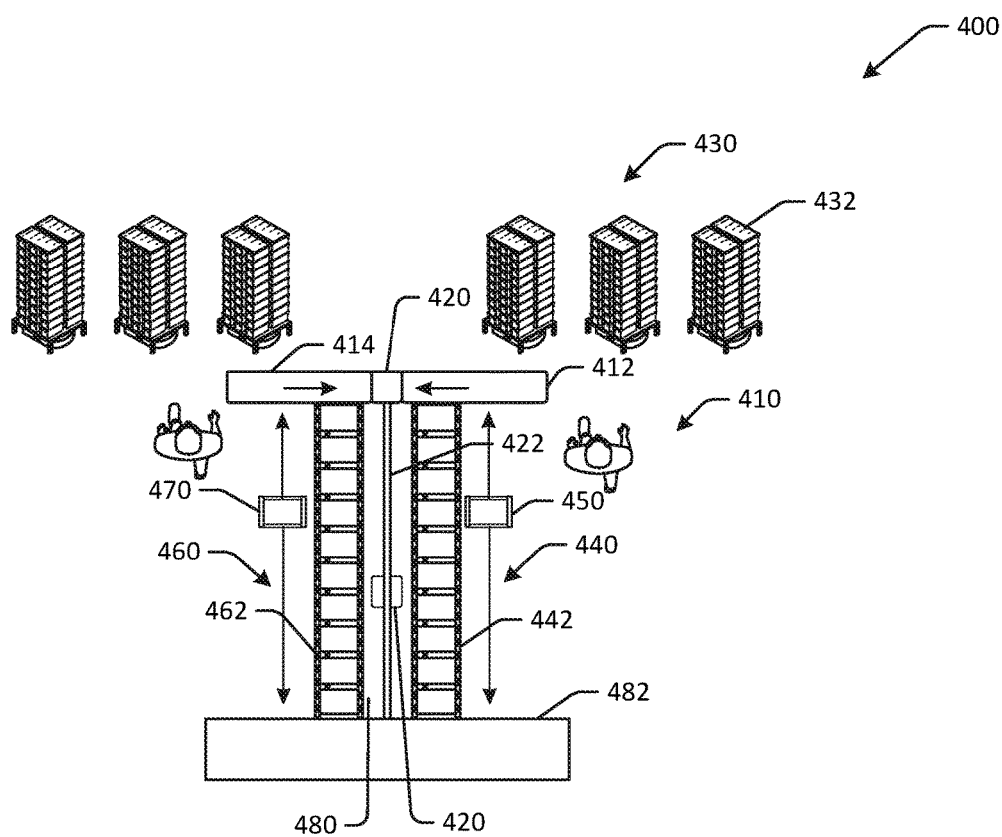
FIGS. 4A-4B are schematic illustrations of an example automated item picking station in various views in accordance with one or more embodiments of the disclosure.
Figure 4A:
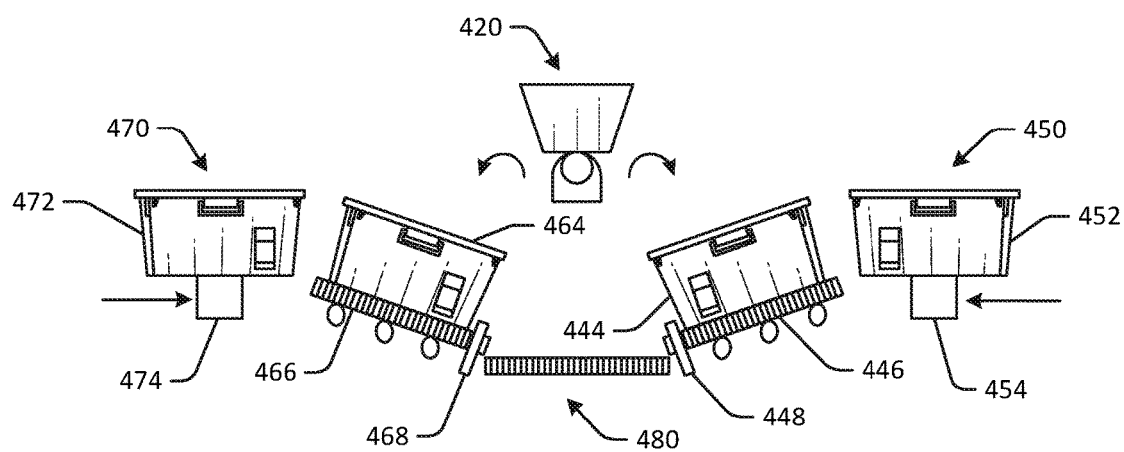
Figure 5:
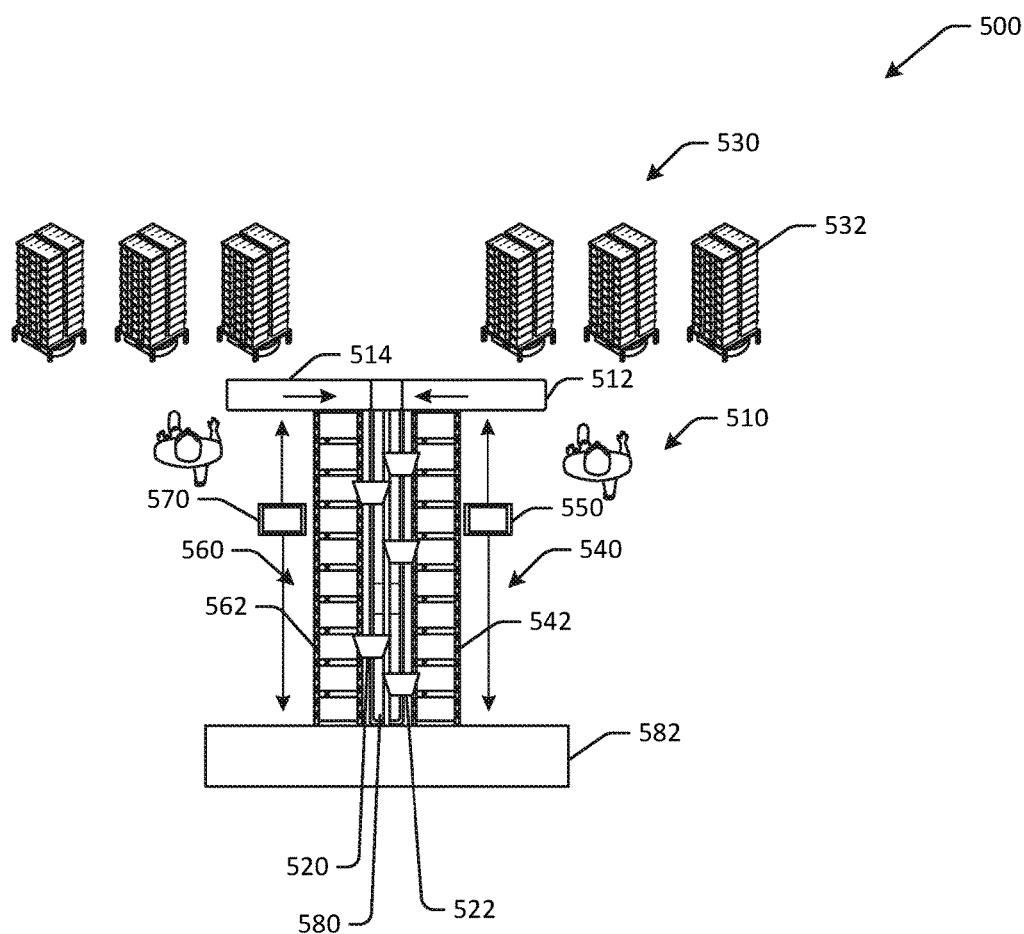
FIG. 5 is a schematic illustration of an example automated item picking station in various views in accordance with one or more embodiments of the disclosure.
Figure 5:
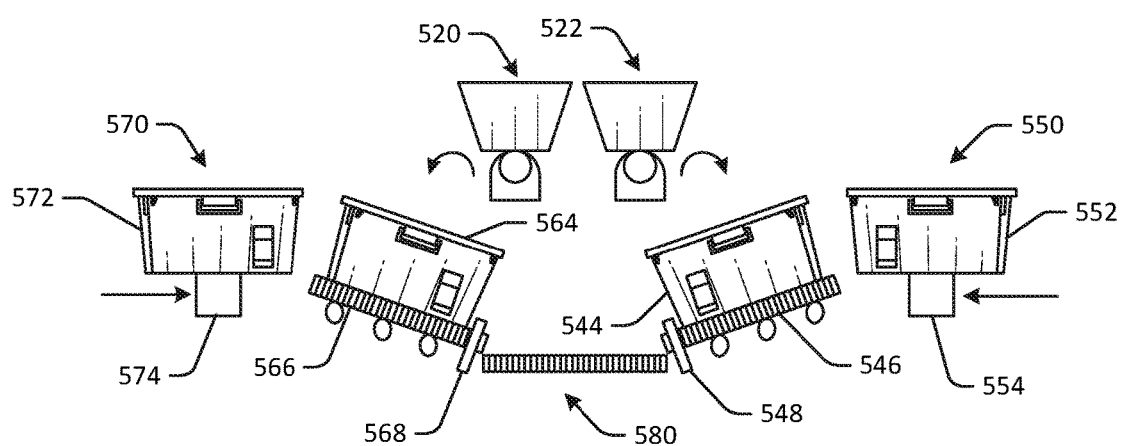

Embodiments reduce the overall cycle time and boost productivity by 25% in some instances, while allowing for retrofitting of existing systems. Some embodiments may be configured to route an empty tote to a shuttle system on both sides of the station, as shown in FIGS. 3A, 4A, and 5, where a single shuttle system will pick up an empty tote and shuttle it to an empty slot. The shuttle can have a simple pusher mechanism to push the tote in place. Full totes are released to a bottom conveyor by disengaging a stop pusher. 3D sensors can be used to monitor totes based on volume fill using volume control sensors. Totes can be mounted to a shake table so that for every item that is dropped the tote is shook to help with volume fill.

Other embodiments may have different configurations for empty tote replenishment. For example, some embodiments may allow a full tote to be ejected forward and down onto exit conveyor but instead of using a shuttle system to inject another empty tote in its place from behind, the totes advance to fill the volume and another empty tote shows up on the front of the line. In such embodiments, tote location may shift dynamically every time a tote is ejected.

Referring to FIG. 1, an example use case 100 for automated item picking stations and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may optionally be static. Automated picking systems, such as those described with respect to FIGS. 3A-7, may be implemented at the picking stage.

At the routing sorter 120, totes including products that have been picked may be routed to the appropriate or designated item sorting system. For example, the routing sorter 120 may determine an identifier associated with the tote, and may determine one or more item sorting systems to which the tote is to be routed using the identifier. The routing sorter 120 may route or direct the tote to the appropriate item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for multi-item orders. For example, a first tote may include a first item of a multi-item order, and a second tote may include a second item of the multi-item order. The item sorting system may therefore identify the orders associated with the respective products in a tote, and may transport the products to a container, such as a flexible container, associated with the order. When the order is complete with all of the products in the associated flexible container, the order may be packed. Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate flexible containers for the orders for which the products were picked.

After a multi-item order is complete (e.g., the item sorting system has delivered all of the products in the order to the appropriate flexible container, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. Packages may be aggregated into moveable carts and/or may otherwise be transported using moveable carts as described herein. In some embodiments, moveable carts may be used to transport items in addition to, or instead of, packages.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
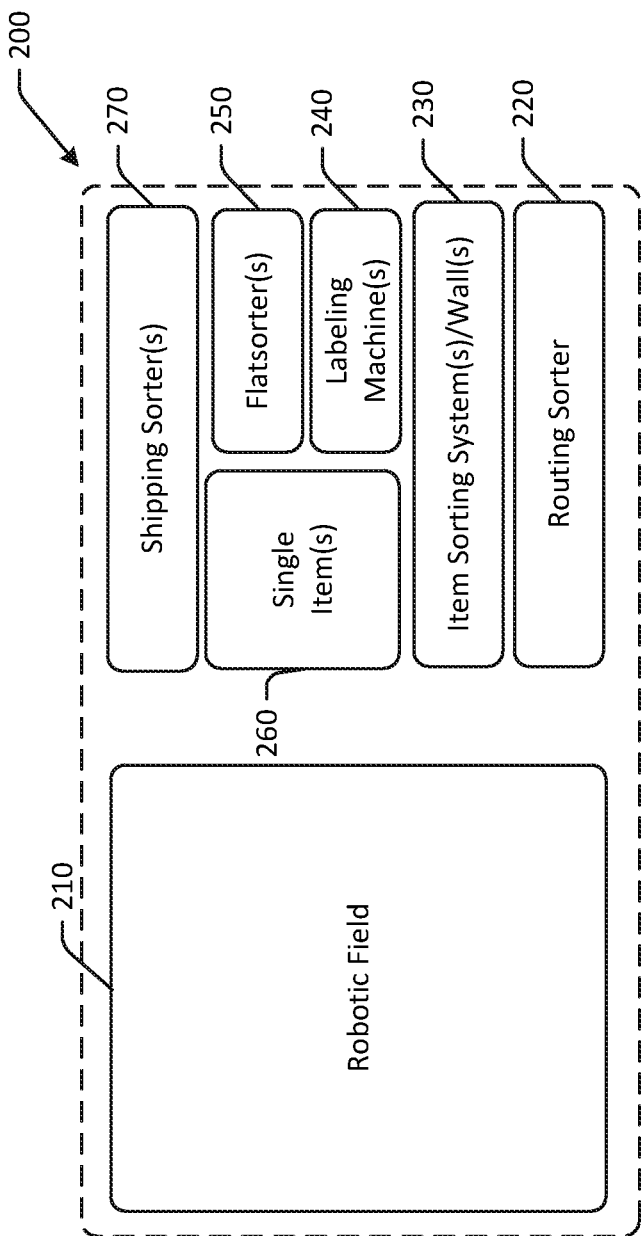
FIG. 2 is a hybrid schematic illustration of an example use case for automated item picking stations in accordance with one or more embodiments of the disclosure.

FIG. 2 is a hybrid schematic illustration of an example use case for automated item picking stations in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 (e.g., package sortation system, etc.) to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into moveable carts using chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of flexible containers (e.g. induct individual items from a container that has multiple items, and place the inducted items into the appropriate flexible container, where flexible containers are associated with multi-item orders. The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include automated item picking stations. The automated item picking stations may reduce manual involvement by automating certain processes and by handling items and containers using various material handling equipment. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3B:
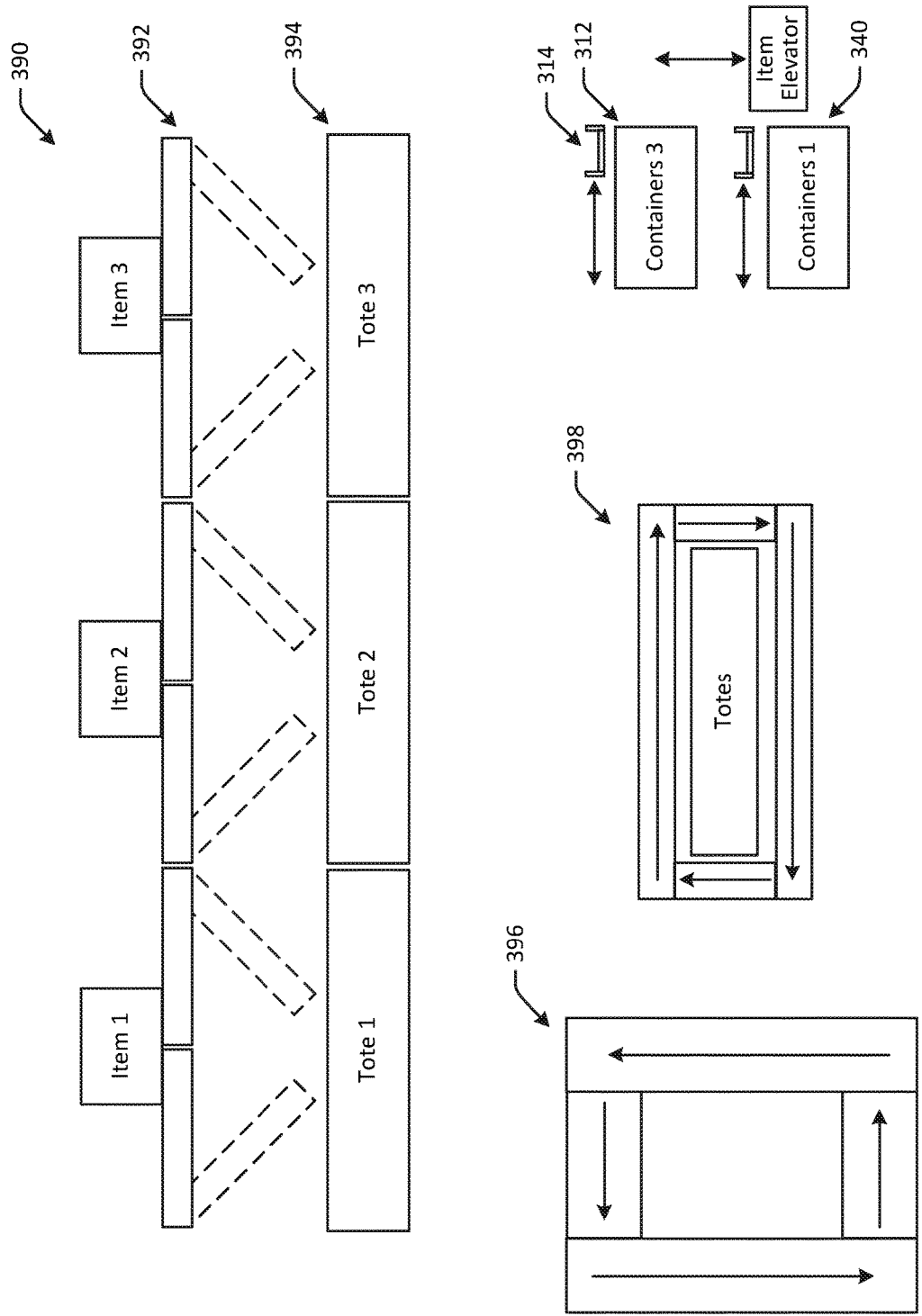

FIGS. 3A-3B are schematic illustrations of an example automated item picking station 310 in various views in accordance with one or more embodiments of the disclosure. Other embodiments may include additional or fewer components. The illustrations of FIGS. 3A-3B are not to scale, and may not be illustrated to scale with respect to other figures. The automated item picking station illustrated in FIGS. 3A-3B may be the automated item picking station discussed with respect to FIGS. 1-2.

The automated item picking station 310 of FIGS. 3A-3B may include a trapdoor style conveyor, where individual slots along the conveyor have a trapdoor that opens to allow an item on the conveyor to fall down into a container disposed underneath the particular conveyor slot. For example, the automated item picking station 310 may include trap door style conveyor(s) where the operator, after picking and scanning each item, will drop it on a traversing open slot. The conveyor runs continuously, at slow speed when no items are detected and faster for drop off when an item is detected. The bottom doors will open on top of the desired tote and drop the item.

The automated item picking station 310 may be disposed in a facility environment 300. One or more robots, such as autonomous robots, may transport pods 330 to the automated item picking station 310. The individual pods 332 may include items that are to be picked by an operator. The individual pods 332 may have different slots or containers in which items are placed in inventory, and operators can pick items from the slots or containers to fulfill orders. The operator may pick an item and may scan the item using one or more scanners or other type of sensor 320. The sensor 320 may be an overhead sensor and may be any suitable sensor configured to identify an item, such as a barcode scanner, a camera, or another type of sensor. Any number of sensors may be included. The sensor 320 may be a part of the automated item picking station 310 or may be a discrete component in communication with the automated item picking station 310.

The scanned items may be transported to a container using one or more item handling devices, such as trapdoor style conveyor slots that form a trapdoor conveyor system. In FIG. 3A, a first item handling device 340 may include a number of individual trapdoor style conveyor slots 342 disposed along a first side of the automated item picking station 310, and a second item handling device 360 may include a number of individual trapdoor style conveyor slots 362 disposed along a second side of the automated item picking station 310.

The automated item picking station 310 may include a first set of container slots 346 configured to support a first set of containers 344. The first set of container slots 346 may be disposed along the first side of the automated item picking station 310. The automated item picking station 310 may include a second set of container slots 366 configured to support a second set of containers 364. The second set of container slots 366 may be disposed adjacent to the first set of container slots 346. For example, the second set of container slots 366 may be disposed along the second side of the automated item picking station 310.

The first item handling device 340 may be configured to transport a first item to a container in the first set of containers 344. In some embodiments, the first item handling device 340 may also be configured to transport the first item to a container in the second set of containers 364. For example, in embodiments where the trapdoor style conveyor forms a closed loop 396, as depicted in FIG. 3B, the individual trapdoor conveyor slots may move over both the first set of containers 344 and the second set of conveyors 364.

The second item handling device 360 may be configured to transport a second item to a container in the second set of containers 364. The second item handling device 360 may be configured to move over the second set of containers 364. In some embodiments, the second item handling device 360 may also be configured to transport the second item to a container in the first set of containers 344. For example, in embodiments where the trapdoor style conveyor forms a closed loop 396, as depicted in FIG. 3B, the individual trapdoor conveyor slots may move over both the first set of containers 344 and the second set of conveyors 364.

When individual containers in the respective first set of container slots 346 and the second set of container slots 366 are full and/or have all of the items in an order, the containers may be automatically replaced. For example, the automated item picking station 310 may include a takeaway conveyor 380 disposed between the first set of container slots 346 and the second set of container slots 366. The takeaway conveyor 380 may be disposed between the first set of container slots 346 and the second set of container slots 366. The takeaway conveyor 380 may be configured to transport full containers to a downstream processing station. The takeaway conveyor 380 may be disposed vertically lower than the container slots. The first set of container slots 346 and the second set of container slots 366 may be inclined surfaces, as depicted in FIG. 3A, such that the containers can be pushed and/or can slide onto the takeaway conveyor 380 and transported downstream for processing, such as to a packing station. The first set of container slots 346 and the second set of container slots 366 may have inclining or declining surfaces. In some embodiments, the container slots may include shaker motors or other devices to help items in the containers settle into position and maximize fill volume.

The automated item picking station 310 may therefore include a first number of container release mechanisms 348 coupled to the first set of container slots 346, and a second number of container release mechanisms 368 coupled to the second set of container slots 366. The container release mechanisms may be retractable tabs or other mechanisms configured to secure a container to a container slot. When released, the container release mechanism may allow the container to slide out of the container slot, over the release mechanism, and onto the takeaway conveyor 380.

The automated item picking station 310 may include a container replenishment system 382. The container replenishment system 382 may include a first empty container shuttle 350 disposed adjacent to the first set of container slots 346, and a second empty container shuttle 370 disposed adjacent to the second set of container slots 366. The first empty container shuttle 350 may be configured to transport empty containers 352 from an empty container queue to a container slot. The first empty container shuttle 350 may include a pusher arm 354 or other device configured to push a full container onto the takeaway conveyor 380 (e.g., as indicated by the arrow adjacent to the pusher arm 354 in FIG. 3A), and may include a conveyor or other device to unload the empty container 352 into the empty container slot when the full container is moved onto the takeaway conveyor 380. The pusher arm 354 may be optionally configured to push an empty container off of the first empty container shuttle 350 and into an empty container slot. Similarly, the second empty container shuttle 370 may be configured to transport empty containers 372 from an empty container queue to a container slot. The second empty container shuttle 370 may include a pusher arm 374 or other device configured to push a full container onto the takeaway conveyor 380 (e.g., as indicated by the arrow adjacent to the pusher arm 374 in FIG. 3A), and may include a conveyor or other device to unload the empty container 372 into the empty container slot when the full container is moved onto the takeaway conveyor 380. The pusher arm 374 may be optionally configured to push an empty container off of the second empty container shuttle 370 and into an empty container slot.

Figure 6:
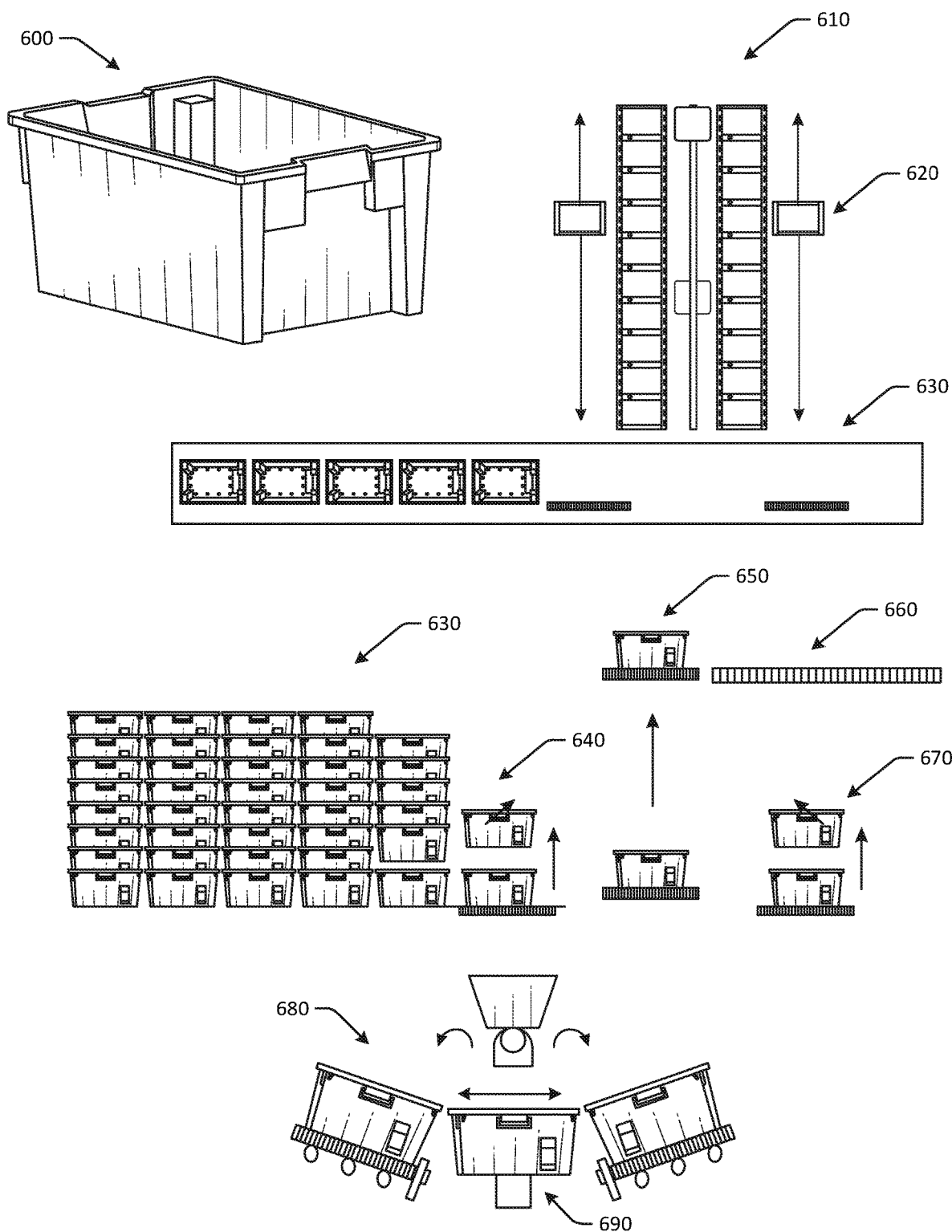
FIG. 6 is a schematic illustration of an empty container replenishment system in accordance with one or more embodiments of the disclosure.

The automated item picking station 310 may optionally include a container elevator, as described with respect to FIG. 6. The container elevator may be part of the container replenishment system 382. The container elevator may be disposed at an end of the takeaway conveyor. The container elevator may be configured to lift full containers to a different level.

In some embodiments, the containers may be disposed in a multi-level arrangement, such as a two-level arrangement that includes an item elevator to transport items to different levels, and then dedicated item handling devices on the respective different levels. For example, instead of two rows of ten containers each, there may be two levels with each level having two rows of five containers each. In this manner, the same total number of containers may be picked to, but the size and footprint of the automated picking system may be reduced. For example, as depicted in FIG. 3B, the automated picking system may include a third set of container slots 312 configured to support a third set of containers, where the third set of container slots 312 is on a different level than the first and second sets of container slots. For example, the third set of container slots may be vertically aligned with and disposed above the first set of container slots. The automated picking system may include a second item handling device 314 configured to transport a second item to a container in the third set of containers, and an item elevator 316 configured to transport items to the second item handling device.

In FIG. 3B, item handling devices 392 (which may include the first item handling device 340 and/or the second item handling device 360) are depicted in side view 390. The item handling devices 392 may include trapdoors that open downwards from a middle portion, such that an item on the item handling device falls into a container 394 below. For example, Item 1 on an item handling device may be dropped into Tote 1 in the example of FIG. 3B. If Item 1 is destined for Tote 3, the trapdoor style conveyor can be advanced until the item handling device is disposed on top of Tote 3, and then released to allow Item 1 to fall into Tote 3. Individual item handling devices may therefore include a first rotatable surface and a second rotatable surface. The first rotatable surface and the second rotatable surface together form a platform to support an item, and the first rotatable surface and the second rotatable surface are configured to be actuated from a flat position to a vertical position to allow the item to fall from the item handling device. The first rotatable surface and the second rotatable surface may rotate downwards and away from each other. The item handling devices may be configured to move over the first set of containers and/or the second set of containers, such that platform is disposed over the containers. Actuation of the first rotatable surface and the second rotatable surface causes the item to fall into a container below.

The trapdoor style conveyor may be arranged in various configurations. For example, in the closed loop 396 arrangement (depicted in a top view), the item handling devices may move above all of the containers in the system (e.g., both the first set and second set of containers). In another embodiment, the trapdoor style conveyor may be arranged in a Ferris wheel arrangement 398 (depicted in a side view), where item handling devices may move over one set of containers and may then return back to an initial position by moving underneath the containers. In such embodiments, different trapdoor style conveyors may be used for the different sets of containers.

During operation, a controller or computer system may be configured to detect an item, determine a destination container associated with the item, and to cause the item handling device to transport the item to the destination container. The controller may cause the item handling device to deposit the item into the destination container.

Figure 4B:
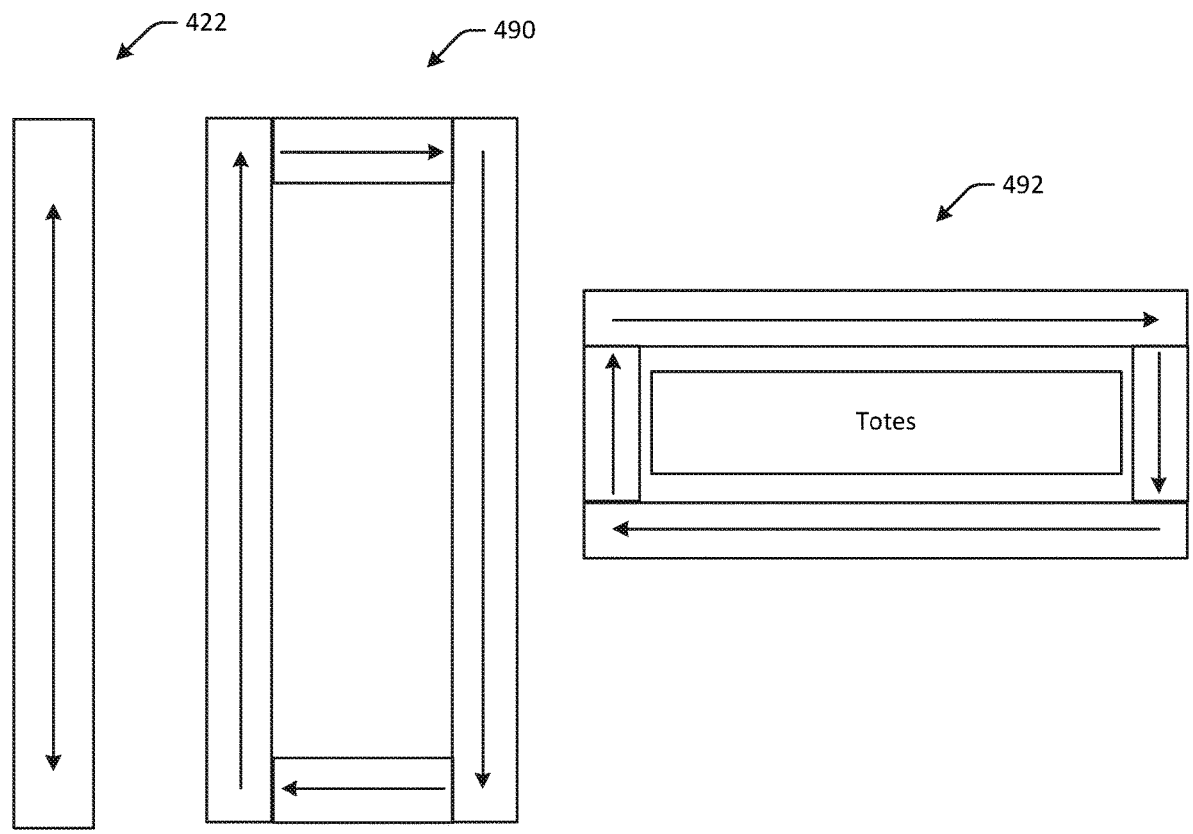

FIGS. 4A-4B are schematic illustrations of an example automated item picking station 410 in various views in accordance with one or more embodiments of the disclosure. Other embodiments may include additional or fewer components. The illustrations of FIGS. 4A-4B are not to scale, and may not be illustrated to scale with respect to other figures. The automated item picking station illustrated in FIGS. 4A-4B may be the automated item picking station discussed with respect to FIGS. 1-2.

In FIGS. 4A-4B, a high speed ladle or other item handling device can be used with linear motors can get up to speeds of 4 m/s and achieve a 3 seconds cycle from start to finish going to the farthest tote which would give it a theoretical 1200 units per hour.

Some embodiments can service two operators on both sides and will transform a pick station into a pick and sort station. Item sorting is also possible based on packaging type. In one example, there are seven possible packaging types (flexible paper padded and unpadded, flexible plastic padded and unpadded, single corrugate, multi corrugate, and "ships in own container"). Embodiments can use one tote for item kick outs with failed bar code scan. Two additional slots, for a total of 10 totes, can be dedicated to the top two most used packaging types to double up on available totes and eliminate operator blockage during tote full/empty exchange.

Embodiments may send picked and sorted totes to the correct sortation wall and related packaging system, eliminating the need for item induction. Operators at outbound can pick items from a tote into a bin or other container, for order consolidation, or simply process them one at a time.

Unlike the trapdoor style conveyor of FIGS. 3A-3B, the automated item picking station 410 may include a high speed ladle system 420 to convey items from an induction conveyor to a destination container. The ladle system 420 may be a reciprocating ladle (e.g., moves back and forth along a track, etc.), or may have a different configuration, as discussed with respect to FIG. 4B. The automated item picking station 410 may provide flexibility by allowing for items to be delivered to containers on either side of the ladle system 420 by allowing for rotation of the ladle in different directions. The automated item picking station 410 may therefore allow an operator to pick to all of the containers in the system.

The automated item picking station 410 may be disposed in a facility environment 400. One or more robots, such as autonomous robots, may transport pods 430 to the automated item picking station 410. The individual pods 432 may include items that are to be picked by an operator. The individual pods 432 may have different slots or containers in which items are placed in inventory, and operators can pick items from the slots or containers to fulfill orders.

Operators may place picked items onto buffering conveyors, such as a first conveyor 412 and an optional second conveyor 414 (so as to allow more than one operator to pick items, etc.). The buffering conveyors may be asynchronous conveyors and may be pleated conveyors, so as to allow for separation between adjacent items. One or more scanners or other sensors may be configured to automatically detect items placed onto the respective conveyors. The sensor may be an overhead sensor and may be any suitable sensor configured to identify an item, such as a barcode scanner, a camera, or another type of sensor. Any number of sensors may be included. The sensor may be a part of the automated item picking station 410 or may be a discrete component in communication with the automated item picking station 410.

The scanned items may be individually retrieved by a ladle of the ladle system 420. The ladle may be a bucket or container shaped device configured to hold an item. The ladle may be powered by a linear motor or other device for high speed motion. The ladle may be configured to move along a track 422. The item may be transferred from the buffering conveyors into the ladle, and the ladle may transport the item to a destination container. The first item handling device or the ladle 420 may be configured to retrieve items from the first conveyor 412 and the second conveyor 414, and to deposit the items into a container from the first row of containers or the second row of containers. To unload the item, the ladle may rotate towards the destination container, as depicted by arrows in FIG. 4A. The ladle may therefore be an item handling device that is configured to transport a first item to a container in any of the first set of containers and the second set of containers.

The automated item picking station 410 may include a first set of container slots 446 configured to support a first set of containers 444. The first set of containers 444 may be arranged in a first row 442 or a first column. The first set of container slots 446 may be disposed along a first side 440 of the automated item picking station 410. The automated item picking station 410 may include a second set of container slots 466 configured to support a second set of containers 464. The second set of containers 464 may be arranged in a second row 462 or a second column. The second set of container slots 466 may be disposed adjacent to the first set of container slots 446. For example, the second set of container slots 466 may be disposed along a second side 460 of the automated item picking station 410. The first item handling device or the ladle 420 may be configured to transport a first item to a container in the first set of containers 444 and the second set of containers 464. The first item handling device or the ladle 420 may be configured to rotate towards the first set of container slots and the second set of container slots.

When individual containers in the respective first set of container slots 446 and the second set of container slots 466 are full and/or have all of the items in an order, the containers may be automatically replaced. For example, the automated item picking station 410 may include a takeaway conveyor 480 disposed between the first set of container slots 446 and the second set of container slots 466. The takeaway conveyor 480 may be disposed between the first set of container slots 446 and the second set of container slots 466. The takeaway conveyor 480 may be configured to transport full containers to a downstream processing station. The takeaway conveyor 480 may be disposed vertically lower than the container slots. The takeaway conveyor 480 may be vertically aligned with the first item handling device or the ladle 420. For example, the takeaway conveyor 480 may be disposed underneath the ladle 420.

The first set of container slots 446 and the second set of container slots 466 may be inclined surfaces, as depicted in FIG. 4A, such that the containers can be pushed and/or can slide onto the takeaway conveyor 480 and transported downstream for processing, such as to a packing station. The first set of container slots 446 and the second set of container slots 466 may have inclining or declining surfaces. In some embodiments, the container slots may include shaker motors or other devices to help items in the containers settle into position and maximize fill volume.

The automated item picking station 410 may include a first number of container release mechanisms 448 coupled to the first set of container slots 446, and a second number of container release mechanisms 468 coupled to the second set of container slots 466. The container release mechanisms may be retractable tabs or other mechanisms configured to secure a container to a container slot. When released, the container release mechanism may allow the container to slide out of the container slot, over the release mechanism, and onto the takeaway conveyor 480. For example, activation of a container release mechanism may cause a corresponding container of a row of containers to slide onto the takeaway conveyor 480.

The automated item picking station 410 may include a container replenishment system 482. The container replenishment system 482 may include a first empty container shuttle 450 disposed adjacent to the first set of container slots 446, and a second empty container shuttle 470 disposed adjacent to the second set of container slots 466. The first empty container shuttle 450 may be configured to transport empty containers 452 from an empty container queue to a container slot. The first empty container shuttle 450 may include a pusher arm 454 or other device configured to push a full container onto the takeaway conveyor 480 (e.g., as indicated by the arrow adjacent to the pusher arm 454 in FIG. 4A), and may include a conveyor or other device to unload the empty container 452 into the empty container slot when the full container is moved onto the takeaway conveyor 480. The pusher arm 454 may be optionally configured to push an empty container off of the first empty container shuttle 450 and into an empty container slot Similarly, the second empty container shuttle 470 may be configured to transport empty containers 472 from an empty container queue to a container slot. The second empty container shuttle 470 may include a pusher arm 474 or other device configured to push a full container onto the takeaway conveyor 480 (e.g., as indicated by the arrow adjacent to the pusher arm 474 in FIG. 4A), and may include a conveyor or other device to unload the empty container 472 into the empty container slot when the full container is moved onto the takeaway conveyor 480. The pusher arm 474 may be optionally configured to push an empty container off of the second empty container shuttle 470 and into an empty container slot.

The automated item picking station 410 may optionally include a container elevator, as described with respect to FIG. 6. The container elevator may be part of the container replenishment system 482. The container elevator may be disposed at an end of the takeaway conveyor. The container elevator may be configured to lift full containers to a different level.

During operation, a controller or computer system may be configured to detect an item, determine a destination container associated with the item, and to cause the item handling device to transport the item to the destination container. The controller may cause the item handling device to deposit the item into the destination container, and may optionally cause the first item handling device to retrieve another item.

As discussed with respect to FIG. 3A, in some embodiments, the containers may be disposed in a multi-level arrangement, such as a two-level arrangement that includes an item elevator to transport items to different levels, and then dedicated item handling devices on the respective different levels. For example, instead of two rows of ten containers each, there may be two levels with each level having two rows of five containers each. In this manner, the same total number of containers may be picked to, but the size and footprint of the automated picking system may be reduced.

FIG. 4B depicts various movement configurations of the ladle system 420 of FIG. 4A. In a reciprocating configuration 422, the ladle may move back and forth along a track, as depicted in FIG. 4A. In a closed loop configuration 490 (depicted in top view), the ladle may move in a loop between the first set of containers and the second set of containers, and may be configured to rotate in both directions. The closed loop configuration 490 may be relatively slower than the reciprocating configuration 422, unless more than one ladle is deployed at the same time. In a Ferris wheel configuration 492 (depicted in side view), the ladle may move over the top of the containers and then may return to an induction point via movement underneath the containers. This may allow for more than one ladle to be used on the same track.

FIG. 5 is a schematic illustration of an example automated item picking station 510 in various views in accordance with one or more embodiments of the disclosure. Other embodiments may include additional or fewer components. The illustration of FIG. 5 is not to scale, and may not be illustrated to scale with respect to other figures. The automated item picking station illustrated in FIG. 5 may be the automated item picking station discussed with respect to FIGS. 1-2.

Like the embodiment of FIGS. 4A-4B, the automated item picking station 510 may include an item handling device, such as a ladle, to transport and deposit items to destination containers. However, unlike the embodiment of FIGS. 4A-4B, the automated item picking station 510 may include two item handling devices. The individual item handling devices may be configured to reciprocate along respective tracks. Each individual item handling device may be configured to rotate towards one set of containers.

The automated item picking station 510 may include a high speed ladle system 540 to convey items from one or more induction conveyors to a destination container. The ladle system 540 may include at least two reciprocating ladles (e.g., moves back and forth along a track, etc.). The automated item picking station 510 may provide flexibility by allowing for items to be delivered to containers on the different sides of the automated item picking station 510 by allowing for each different ladle to rotate in different directions.

The automated item picking station 510 may be disposed in a facility environment 500. One or more robots, such as autonomous robots, may transport pods 530 to the automated item picking station 510. The individual pods 532 may include items that are to be picked by an operator. The individual pods 532 may have different slots or containers in which items are placed in inventory, and operators can pick items from the slots or containers to fulfill orders.

Operators may place picked items onto buffering conveyors, such as a first conveyor 512 and an optional second conveyor 514 (so as to allow more than one operator to pick items, etc.). The buffering conveyors may be asynchronous conveyors and may be pleated conveyors, so as to allow for separation between adjacent items. One or more scanners or other sensors may be configured to automatically detect items placed onto the respective conveyors. The sensor may be an overhead sensor and may be any suitable sensor configured to identify an item, such as a barcode scanner, a camera, or another type of sensor. Any number of sensors may be included. The sensor may be a part of the automated item picking station 510 or may be a discrete component in communication with the automated item picking station 510.

The scanned items may be individually retrieved by a ladle of the ladle system 540. The ladle system 540 may include a first item handling device 522, such as a first ladle, and a second item handling device 520, such as a second ladle. The ladles may be a bucket or container shaped device configured to hold an item. The ladles may be powered by a linear motor or other device for high speed motion. The ladles may be configured to move along respective tracks. The item may be transferred from the buffering conveyors into the ladle, and the ladle may transport the item to a destination container. The first item handling device 522 may be configured to retrieve items from the first conveyor 512, and the second item handling device 520 may be configured to retrieve items from the second conveyor 514. The ladles may deposit the items into a container from the first row of containers or the second row of containers. To unload the item, the ladle may rotate towards the respective destination container, as depicted by the individual arrows in FIG. 5. The ladles may therefore be item handling devices that are configured to transport items to a container in either the first set of containers or the second set of containers.

The automated item picking station 510 may include a first set of container slots 546 configured to support a first set of containers 544. The first set of containers 544 may be arranged in a first row 542 or a first column. The first set of container slots 546 may be disposed along a first side of the automated item picking station 410. The automated item picking station 510 may include a second set of container slots 566 configured to support a second set of containers 564. The second set of containers 564 may be arranged in a second row 562 or a second column. The second set of container slots 566 may be disposed adjacent to the first set of container slots 546. For example, the second set of container slots 566 may be disposed along a second side 560 of the automated item picking station 510. The first item handling device or the ladle 522 may be configured to transport a first item to a container in the first set of containers 544, and the second item handling device or the ladle 520 may be configured to transport a second item to a container in the second set of containers 564. The first item handling device or the ladle 522 may be configured to rotate towards the first set of container slots, and the second item handling device or the ladle 520 may be configured to rotate towards the second set of container slots.

When individual containers in the respective first set of container slots 546 and the second set of container slots 566 are full and/or have all of the items in an order, the containers may be automatically replaced. For example, the automated item picking station 510 may include a takeaway conveyor 580 disposed between the first set of container slots 546 and the second set of container slots 566. The takeaway conveyor 580 may be disposed between the first set of container slots 546 and the second set of container slots 566. The takeaway conveyor 580 may be configured to transport full containers to a downstream processing station. The takeaway conveyor 580 may be disposed vertically lower than the container slots. The takeaway conveyor 580 may be vertically aligned with the first item handling device and the second item handling device. For example, the takeaway conveyor 480 may be disposed underneath the ladle system 540.

The first set of container slots 546 and the second set of container slots 566 may be inclined surfaces, as depicted in FIG. 5, such that the containers can be pushed and/or can slide onto the takeaway conveyor 580 and transported downstream for processing, such as to a packing station. The first set of container slots 546 and the second set of container slots 566 may have inclining or declining surfaces. In some embodiments, the container slots may include shaker motors or other devices to help items in the containers settle into position and maximize fill volume.

The automated item picking station 510 may include a first number of container release mechanisms 548 coupled to the first set of container slots 546, and a second number of container release mechanisms 568 coupled to the second set of container slots 566. The container release mechanisms may be retractable tabs or other mechanisms configured to secure a container to a container slot. When released, the container release mechanism may allow the container to slide out of the container slot, over the release mechanism, and onto the takeaway conveyor 580. For example, activation of a container release mechanism may cause a corresponding container of a row of containers to slide onto the takeaway conveyor 580.

The automated item picking station 510 may include a container replenishment system 582. The container replenishment system 582 may include a first empty container shuttle 550 disposed adjacent to the first set of container slots 546, and a second empty container shuttle 570 disposed adjacent to the second set of container slots 566. The first empty container shuttle 550 may be configured to transport empty containers 552 from an empty container queue to a container slot. The first empty container shuttle 550 may include a pusher arm 554 or other device configured to push a full container onto the takeaway conveyor 580 (e.g., as indicated by the arrow adjacent to the pusher arm 554 in FIG. 5), and may include a conveyor or other device to unload the empty container 552 into the empty container slot when the full container is moved onto the takeaway conveyor 580. The pusher arm 554 may be optionally configured to push an empty container off of the first empty container shuttle 550 and into an empty container slot Similarly, the second empty container shuttle 570 may be configured to transport empty containers 572 from an empty container queue to a container slot. The second empty container shuttle 570 may include a pusher arm 574 or other device configured to push a full container onto the takeaway conveyor 580 (e.g., as indicated by the arrow adjacent to the pusher arm 574 in FIG. 5), and may include a conveyor or other device to unload the empty container 572 into the empty container slot when the full container is moved onto the takeaway conveyor 580. The pusher arm 574 may be optionally configured to push an empty container off of the second empty container shuttle 570 and into an empty container slot.

The automated item picking station 510 may optionally include a container elevator, as described with respect to FIG. 6. The container elevator may be part of the container replenishment system 582. The container elevator may be disposed at an end of the takeaway conveyor. The container elevator may be configured to lift full containers to a different level.

During operation, a controller or computer system may be configured to detect an item, determine a destination container associated with the item, and to cause the item handling device to transport the item to the destination container. The controller may cause the item handling device to deposit the item into the destination container, and may optionally cause the first item handling device to retrieve another item. The controller may cause the first item handling device 522 to rotate towards containers in the first set of containers, and the second item handling device 520 to rotate towards containers in the second set of containers. The second item handling device 520 may be configured to move independent of the first item handling device 522. The first item handling device 522 and the second item handling device 520 may be coupled to individual linear tracks. The first item handling device 522 may be configured to rotate towards the first row of containers, and the second item handling device 520 may be configured to move parallel to the first item handling device 522, and to move independent of the first item handling device 522.

FIG. 6 is a schematic illustration of an empty container replenishment system in accordance with one or more embodiments of the disclosure. Other embodiments may include additional or fewer components. The illustration of FIG. 6 may not be to scale, and may not be illustrated to scale with respect to other figures. The empty container replenishment system illustrated in FIG. 6 may be used with any of the systems discussed with respect to FIGS. 1-5.

In FIG. 6, an example empty container 600 is depicted. The empty container 600 may be used to replace full containers in an automated item picking system 610. The automated item picking system 610 may include a first conveyor configured to transport a first item, a sensor configured to detect the first item, an empty container queue 630 configured to support empty containers, a first row of containers disposed between the first conveyor and the empty container queue 630, and a second row of containers arranged parallel to the first row of containers. The automated item picking system 610 may include a first item handling device configured to move between the first row of containers and the second row of containers, where the first item handling device is configured to retrieve the first item from the first conveyor and to deposit the first item into a container of the first row of containers or the second row of containers. The automated item picking system 610 may include a takeaway conveyor disposed between the first row of containers and the second row of containers, the takeaway conveyor configured to transport full containers to a downstream processing station.

Full containers may be replaced by one or more shuttles 620. For example, the empty container queue 630 may include one or more empty containers, which may be arranged in stacks. The automated item picking system 610 may include a container elevator 650 disposed at an end of the takeaway conveyor, where the container elevator 650 can be used to transfer full containers to a downstream conveyor 660. Empty containers 640, 670 may be loaded onto shuttles 620 and transported to container slots to replace full containers. For example, the automated item picking system 610 may include a first empty container shuttle disposed adjacent to the first row of containers, the first empty container shuttle configured to transport an empty container from the empty container queue 630 to replace a full container of the first row of containers, and a second empty container shuttle disposed adjacent to the second row of containers, the second empty container shuttle configured to transport an empty container from the empty container queue 630 to replace a full container of the second row of containers.

In some embodiments, instead of dedicated empty container shuttles servicing individual rows of containers, a single empty container shuttle 690 may be used to replace full containers in more than one row of containers, as depicted in embodiment 680. For example, the single empty container shuttle 690 may be disposed between the first set of container slots and the second set of container slots instead of the takeaway conveyor, and may therefore be used to retrieve full containers (e.g., gravity may allow the full containers to slide onto the single empty container shuttle 690, which can transport the container to a takeaway conveyor disposed at an end of the shuttle track, etc.), and to position empty containers into container slots. Such replacement shuttles may be used with any of the embodiments described herein, and may accommodate locations with limited footprint space.

Figure 7:
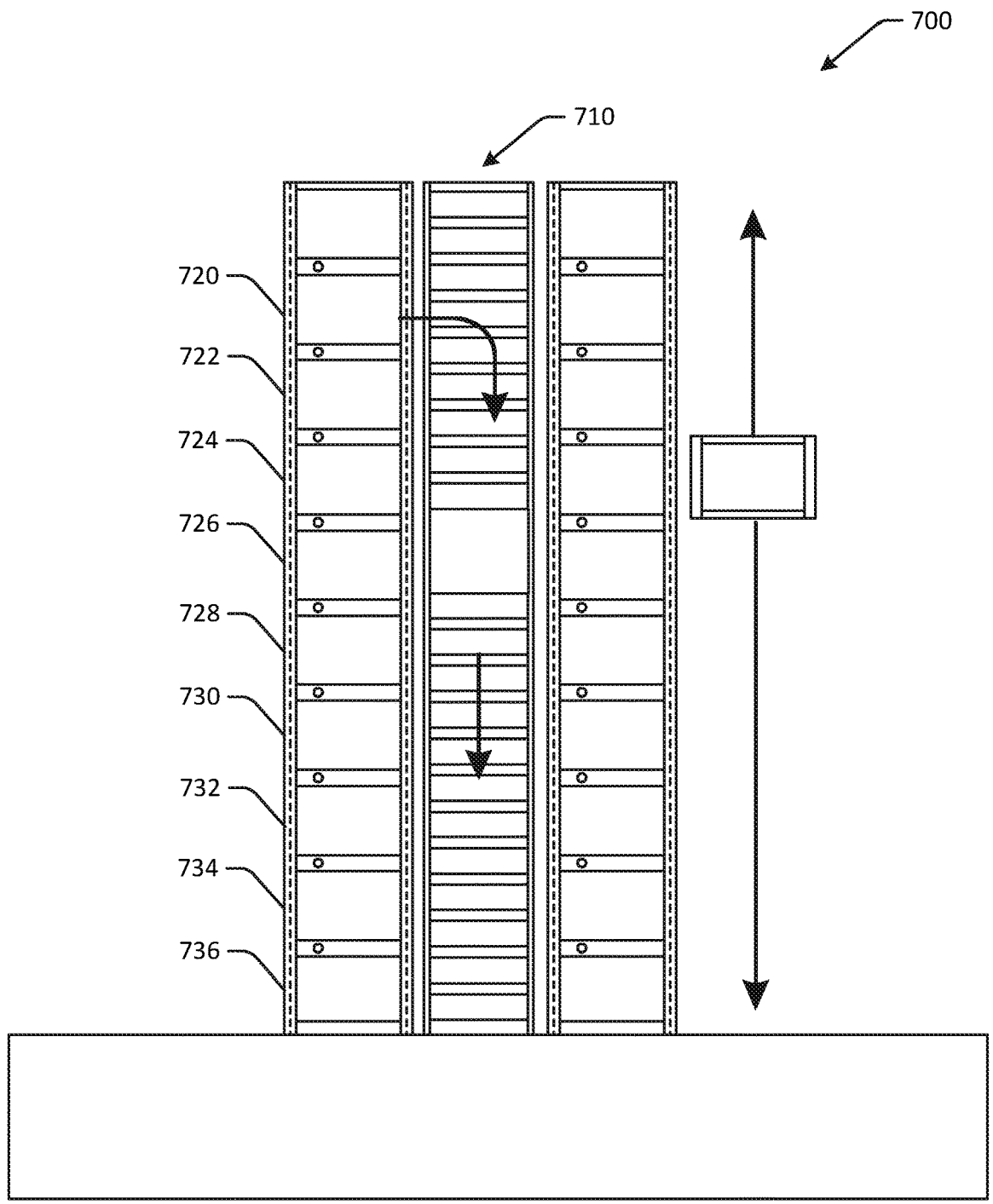
FIG. 7 is a schematic illustration of an automated item picking station with packaging-based sortation in accordance with one or more embodiments of the disclosure.

FIG. 7 is a schematic illustration of an automated item picking station 700 with packaging-based sortation in accordance with one or more embodiments of the disclosure. Other embodiments may include additional or fewer components. The illustration of FIG. 7 may not be to scale, and may not be illustrated to scale with respect to other figures. The system illustrated in FIG. 7 may be the same system discussed with respect to FIGS. 1-6.

Increasing the pick locations can allow the system to pick to totes based on packaging process path to include flexible padded and unpadded paper, flexible padded and unpadded plastic, single and multi-item corrugates, etc.

For example, in FIG. 7, the automated item picking station 700 may include a number of different containers designated for different packaging process paths. For example, items picked to a first container 720 may be designated for a flexible unpadded paper processing path, items picked to a second container 722 may be designated for a flexible padded paper processing path, items picked to a third container 724 may be designated for a flexible unpadded plastic processing path, items picked to a fourth container 726 may be designated for a flexible padded plastic processing path, items picked to a fifth container 728 may be designated for a single corrugate processing path, items picked to a sixth container 730 may be designated for a multi-corrugate processing path, items picked to a seventh container 732 may be designated for a ships-in-its-own-container processing path, items picked to an eighth container 734 may be designated for an "other" processing path, items picked to a ninth container 736 may be designated for a manual handling processing path, and so forth. Other types of packaging designations may be used and any number of containers may be included.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
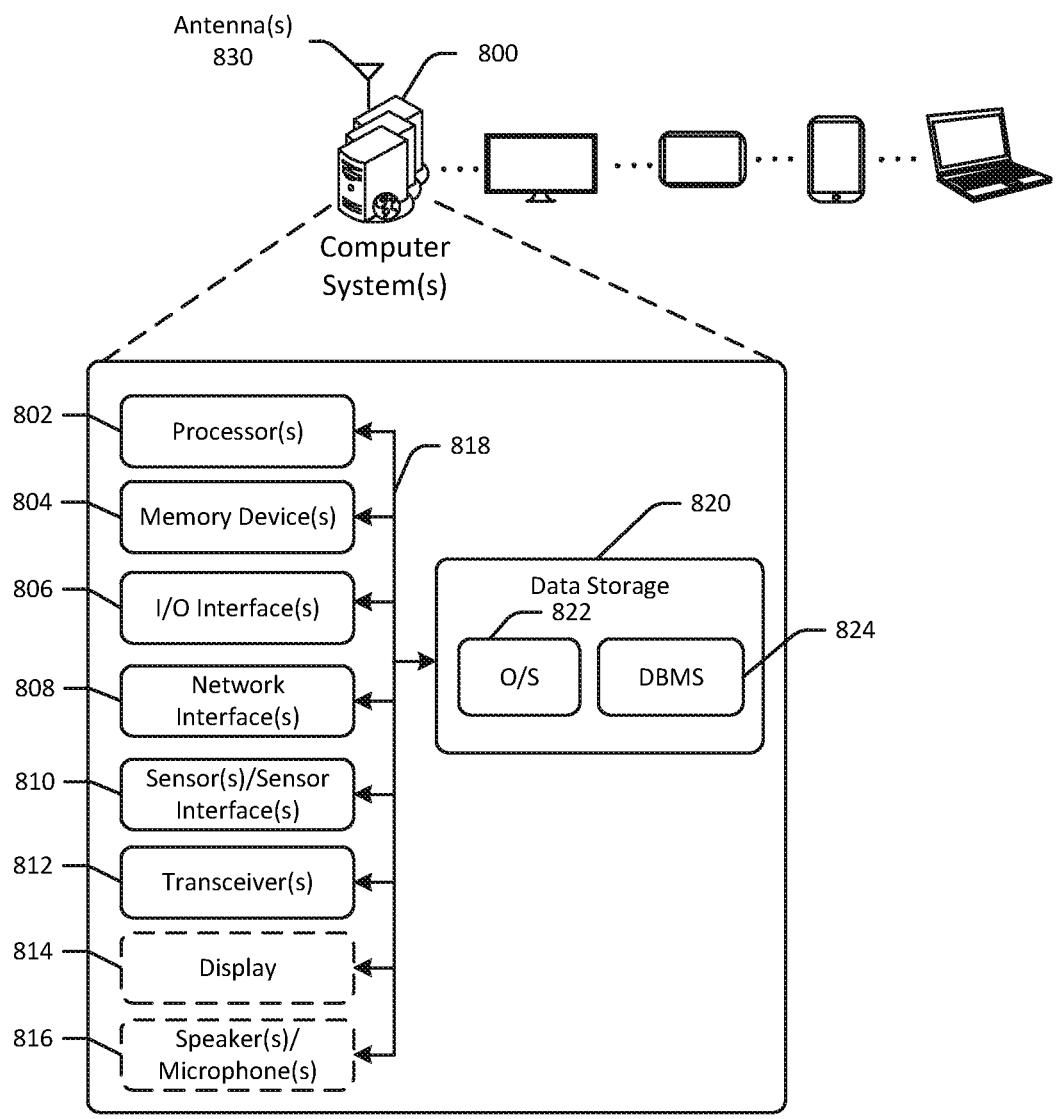
FIG. 8 schematically illustrates an example architecture of a computer system associated with an automated item picking station in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with the system(s) of FIGS. 1-7.

The computer system(s) 800 may be configured to communicate with one or more servers, user devices, or the like. The computer system(s) 800 may be configured to cause the automated item picking station(s) to handle one or more items and/or containers, such as sorting items into one or more containers, move full or empty containers, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item picking system comprising:
   a first conveyor configured to transport a first item;
   a sensor configured to detect the first item;
   an empty container queue configured to support empty containers;
   a first row of containers disposed between the first conveyor and the empty container queue;
   a second row of containers arranged parallel to the first row of containers, wherein containers in the first row of containers and the second row of containers are disposed on declining surfaces;
   a first item handling device configured to move between the first row of containers and the second row of containers, wherein the first item handling device is configured to retrieve the first item from the first conveyor and to deposit the first item into a container of the first row of containers or the second row of containers;
   a takeaway conveyor disposed between the first row of containers and the second row of containers, the takeaway conveyor configured to transport full containers to a downstream processing station;
   a container elevator disposed at an end of the takeaway conveyor and adjacent to the empty container queue, the container elevator configured to elevate full containers received from the takeaway conveyor;
   a first plurality of container release mechanisms disposed adjacent to respective individual containers in the first row of containers, wherein activation of a container release mechanism causes a corresponding container of the first row of containers to slide onto the takeaway conveyor;
   a second plurality of container release mechanisms disposed adjacent to respective individual containers in the second row of containers, wherein activation of a container release mechanism causes a corresponding container of the second row of containers to slide onto the takeaway conveyor;
   a first empty container shuttle disposed between the first set of container slots and the second set of container slots, the first empty container shuttle configured to transport an empty container from the empty container queue to replace a full container of the first row of containers, wherein the first empty container shuttle comprises a pusher arm configured to push an empty container off of the first empty container shuttle and into an empty container slot; and
   a second empty container shuttle disposed adjacent to the second row of containers, the second empty container shuttle configured to transport an empty container from the empty container queue to replace a full container of the second row of containers.

2. The item picking system of claim 1, further comprising:
   a second conveyor configured to transport a second item, wherein the first item handling device is further configured to retrieve the second item from the second conveyor and to deposit the second item into a container from the first row of containers or the second row of containers; and
   a controller configured to:
      detect the first item using the sensor;
      determine a destination container associated with the first item;

cause the first item handling device to retrieve the first item;
cause the first item handling device to transport the first item to the destination container;
cause the first item handling device to deposit the first item into the destination container; and
cause the first item handling device to retrieve the second item.

3. The item picking system of claim 1, wherein the first item handling device is configured to rotate towards the first row of containers, the item picking system further comprising:
a second conveyor configured to transport a second item; and
a second item handling device configured to move parallel to the first item handling device, and to move independent of the first item handling device, wherein the second item handling device is configured to retrieve the second item from the second conveyor and to deposit the second item into a container from the second row of containers;
wherein the second item handling device is configured to rotate towards the second row of containers.

4. An item picking system comprising:
a first set of container slots configured to support a first set of containers;
a second set of container slots configured to support a second set of containers, wherein the second set of container slots is adjacent to the first set of container slots;
a third set of container slots configured to support a third set of containers, wherein the third set of container slots is vertically aligned with and disposed above the first set of container slots;
a first item handling device configured to transport a first item to a container in the first set of containers or the second set of containers;
a second item handling device configured to transport a second item to a container in the third set of containers;
a first empty container shuttle disposed adjacent to the first set of container slots; and
a takeaway conveyor configured to transport full containers to a downstream processing station.

5. The item picking system of claim 4, wherein the first item handling device comprises:
a first rotatable surface; and
a second rotatable surface;
wherein the first rotatable surface and the second rotatable surface together form a platform to support the first item, and wherein the first rotatable surface and the second rotatable surface are configured to be actuated from a flat position to a vertical position.

6. The item picking system of claim 5, wherein the first item handling device is configured to move over the first set of containers, such that platform is disposed over the first set of containers; and
wherein actuation of the first rotatable surface and the second rotatable surface causes the first item to fall into the container of the first set of containers.

7. The item picking system of claim 4, further comprising:
a second item handling device configured to transport a second item to a container in the first set of containers or the second set of containers;
wherein the second item handling device is configured to move over the second set of containers.

8. The item picking system of claim 4, further comprising:
a second empty container shuttle disposed adjacent to the second set of container slots.

9. The item picking system of claim 4, further comprising:
a first conveyor configured to transport the first item; and
a second conveyor configured to transport a second item;
wherein the first item handling device is disposed between the first set of container slots and the second set of container slots, and wherein the first item handling device is configured to rotate towards the first set of container slots and the second set of container slots.

10. The item picking system of claim 9, further comprising:
a second item handling device configured to transport a second item to a container in the second set of containers;
wherein the second item handling device is configured to move independent of the first item handling device.

11. The item picking system of claim 10, wherein the first item handling device and the second item handling device are coupled to individual linear tracks.

12. The item picking system of claim 9, wherein the takeaway conveyor is disposed between the first set of container slots and the second set of container slots, and is vertically aligned with the first item handling device.

13. The item picking system of claim 4, further comprising:
an item elevator configured to transport items to the second item handling device.

14. The item picking system of claim 4, further comprising:
a controller configured to:
detect the first item;
determine a destination container associated with the first item;
cause the first item handling device to transport the first item to the destination container; and
cause the first item handling device to deposit the first item into the destination container.

15. The item picking system of claim 4, further comprising:
a first plurality of container release mechanisms coupled to the first set of container slots; and
a second plurality of container release mechanisms coupled to the second set of container slots.

16. The item picking system of claim 15, further comprising:
a container elevator disposed at an end of the takeaway conveyor;
wherein the first set of container slots and the second set of container slots comprise declining surfaces;
wherein the first empty container shuttle comprises a pusher arm configured to push an empty container off of the first empty container shuttle and into an empty container slot; and
wherein the first empty container shuttle is disposed between the first set of container slots and the second set of container slots.

17. An automated item picking system comprising:
a first set of container slots configured to support a first set of containers;
a first plurality of container release mechanisms coupled to the first set of container slots;
a first empty container shuttle disposed between the first set of container slots and the second set of container slots, wherein the first empty container shuttle comprises a pusher arm configured to push an empty container off of the first empty container shuttle and into an empty container slot;
a second set of container slots configured to support a second set of containers, wherein the second set of container slots is adjacent to the first set of container slots, wherein the first set of container slots and the second set of container slots comprise declining surfaces;
a second plurality of container release mechanisms coupled to the second set of container slots;
a first item handling device configured to transport a first item to a container in the first set of containers or the second set of containers;
a second item handling device configured to transport a second item to a container in the second set of containers; and
a controller configured to:
  detect the first item;
  determine a destination container associated with the first item;
  cause the first item handling device to transport the first item to the destination container; and
  cause the first item handling device to deposit the first item into the destination container.

18. The automated item picking system of claim 17, further comprising:
a takeaway conveyor configured to transport full containers to a downstream processing station.

19. The automated item picking system of claim 17, further comprising:
a second empty container shuttle disposed adjacent to the second set of container slots.

* * * * *